W. H. KEMPTON.
COMPOSITE LAMINATED BODY.
APPLICATION FILED JUNE 17, 1918.

1,414,420.

Patented May 2, 1922.

WITNESSES:
H.B.Funk.
W.H.Woodman.

INVENTOR
Willard H. Kempton.
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

COMPOSITE LAMINATED BODY.

1,414,420.  Specification of Letters Patent.  Patented May 2, 1922.

Application filed June 17, 1918. Serial No. 240,307.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Composite Laminated Bodies, of which the following is a specification.

My invention relates to improvements in composite, laminated bodies and more particularly to bodies made up of laminations of fibrous, sheet material such as duck or other woven fabrics and paper, cotton batting or other matted material all impregnated with a suitable adhesive or binder such as shellac, copal or a phenolic condensation product as, for example, bakelite.

It has been found that composite sheets or bodies built up in this manner vary in certain respects according to the type of sheet material employed and that, as a result, bodies formed of one sheet material are superior, for some purposes, to bodies formed of other sheet materials.

For example, it has been found that a body built up of laminations of duck impregnated with bakelite may be split between the laminations more readily than a similar body built up of paper impregnated with the same binder. Examination of the duck surfaces exposed by such a fracture discloses the fact that the joint previously connecting these surfaces was very rich in the binder employed and that, as a result, the duck surfaces themselves engaged each other merely at a series of points. This is probably due to the fact that the duck is fabricated from comparatively hard twisted threads. The same condition, of course, obtains, to a more or less extent, with all woven fabrics.

In view of this, one of the primary objects of my invention is to provide a composite laminated body in which maximum surface areas of the adjacent sheets of fibrous material engage each other and in which, as a result, there is a minimum amount of the binder forming the joint between adjacent sheets.

Figure 1:
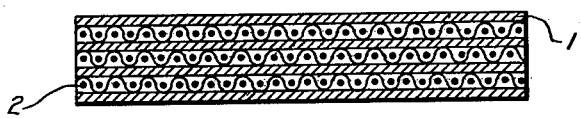
Figure 2:
Figure 3:
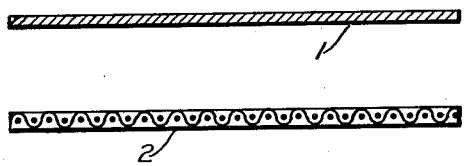

With these and other objects in view, my invention will be more fully described, illustrated in the drawings and then particularly pointed out in the claims. Fig. 1 is a sectional view of a composite laminated plate of my improved type in the process of construction; Fig. 2 is a corresponding view showing the finished plate; Fig. 3 is a sectional view showing laminations of the materials employed in constructing the plate.

In practising my invention, I build up a composite laminated body of fibrous sheet material impregnated with a suitable binder which is subsequently hardened while the body is under pressure. The sheet material employed may vary but, in any event, alternate sheets of material are of such character that they may be compressed to have close surface engagement with the other sheets.

For example, in the drawings I have illustrated a body built up of alternate sheets of paper 1 and of duck 2, these sheets of course being impregnated with a suitable binder, such as a phenolic condensation product. The body so built up is subjected to the action of heat and pressure to consolidate it and harden the binder and so form a solid, substantially insoluble, homogeneous mass.

Preferably, the paper employed should be of an extremely loose porous variety, such, for instance, as a thick grade of towel paper. However, in place of the paper, layers of loose fibrous material, such as cotton batting or other material which will flow into and conform to the irregularities of the surface of the duck, may be employed.

Obviously, unless the sheet materials are too highly impregnated with the bakelite or other binder, a larger surface contact between the adjacent sheets will be obtained than would be possible when employing all duck or even all paper and, for this reason, a much stronger joint between the layers or sheets is obtained.

Although I have illustrated the employment of alternate layers of duck and paper, it will be appreciated that various materials of proper character may be substituted for them, my invention residing broadly in the employment of alternate layers of different fibrous materials of such character as to afford maximum surface contact between the layers. Because of this, I wish it understood that no limitations are to be imposed upon this invention other than those indicated by the claims.

I claim as my invention:

1. A composite laminated body comprising alternate sheets of woven material and of matted material, all impregnated with a hardened binder.

2. A composite laminated body comprising sheets of woven fabric impregnated with a phenolic condensation product and interspersed sheets of a loosely matted material impregnated with a phenolic condensation product, the assembled body being rendered compact and solid by the application of heat and pressure.

3. A method of forming composite laminated bodies that comprises stacking sheets of impregnated woven fabric with alternate sheets of loosely matted fibrous material impregnated with a binder and treating the stacked bodies so formed to harden the binder and compact the body.

4. A method of forming composite laminated bodies that comprises stacking phenolic condensation product impregnated sheets of paper and woven material in alternate disposition and in subjecting the stacked body to heat and pressure to compact it and harden the phenolic condensation product.

5. A composite body comprising alternate layers of woven material and of matted material, all impregnated with a heat-hardened binder.

6. A composite body comprising alternate layers of woven material and of matted material, all impregnated with a phenolic condensation product as a binder.

7. A composite body comprising alternate layers of duck and paper impregnated and united by a hardened phenolic condensation product.

In testimony whereof, I have hereunto subscribed my name this 31st day of May, 1918.

WILLARD H. KEMPTON.